Jan. 1, 1952          C. M. HARRIS          2,580,770
HITCH
Filed May 15, 1950
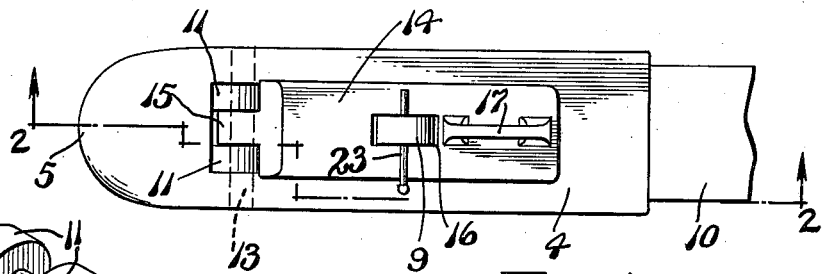
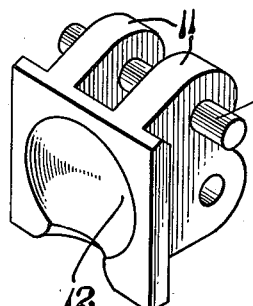
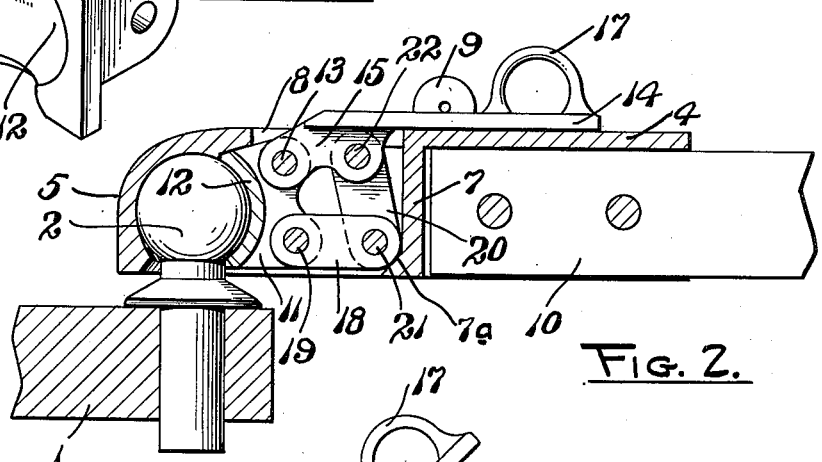
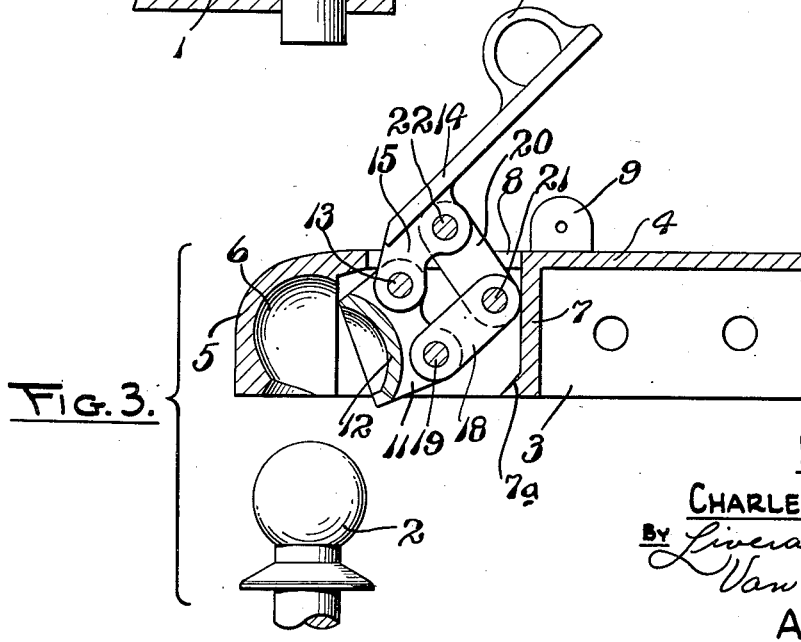
INVENTOR
CHARLES M. HARRIS
BY
ATTORNEYS Patented Jan. 1, 1952

2,580,770

UNITED STATES PATENT OFFICE 2,580,770

HITCH

Charles M. Harris, Holland, Mich.

Application May 15, 1950, Serial No. 162,069

3 Claims. (Cl. 280—33.17)

This invention relates to a hitch, and is concerned with hitches to be used for the releasable connection of a house trailer to an automobile which pulls it. The hitch of my invention is of a novel character and relatively light in weight compared to the much heavier hitches used between the large freight carrying trailers and heavy trucks which draw them. It is very economically produced, requiring little machine work, which consists, largely if not entirely, of drilling or reaming some holes for the passage of pivot pins and is of a sturdy and durable character, having long life, is very readily assembled, is easy to release and also to put in its operative position for connection of an automobile and a house trailer, and is insured against disconnection except when such disconnection is wanted.

An understanding of the invention, having the advantages and qualities stated, as well as others not at this time enumerated but will herein after appear, may be had from the following description, taken in connection with the accompanying drawing, in which, Fig. 1 is a plan view of the hitch of my invention.

Fig. 2 is a longitudinal vertical section, substantially on the plane of line 2—2 of Fig. 1 with the hitch in its operative position.

Fig. 3 is a section similar to Fig. 2, showing the hitch with the parts moved to a position where disconnection takes place and, Fig. 4 is a somewhat enlarged perspective view of the movable socket member of the hitch which, in cooperation with a fixed socket portion, in operative position securely connects and locks the hitch carried, for example, by a trailer extending to the front thereof with a post having a ball at its upper end connected to the automobile.

Like reference characters refer to like parts in the different figures of the drawing.

At the rear of an automobile, a bar 1, or the like, may be permanently connected in any suitable manner with a selected part of the automobile frame, or its bumper, with which a post terminating at its upper end in a ball 2 is connected. This post is of a well-known and conventional structure used with many hitches.

The hitch of my invention includes a housing of a generally inverted channel form, having two spaced depending sides 3, a top 4 and a closed front end 5, at the inner side of which is a recess 6 adapted to partly cover and surround the ball member 2 which, when received within the front portion of the hitch is adapted to seat in the recess 6 shaped to received it. A transverse partition 7 between the ends of the hitch extends from one side 3 to the other, being integrally cast therewith, which at its lower end and front side is thickened and shaped to provide a shoulder 7, as shown. The top 4 in front of the partition 7 has a rectangular opening 8 symmetrical with the longitudinal central plane of the housing. Immediately back of the opening 8, and integrally cast with the top 4, is an upwardly extending lug 9 which has a horizontal opening through it.

The housing is designed for attachment to a bar or tongue 10 extending rearwardly and connected with the trailer which is to be drawn. The front end portion of the bar 10 extends substantially to the partition 7, is below the top 4 and between the spaced sides 3. Transverse bolts pass through the sides 3 and the member 10 for the connection of them.

In the space forward of the partition 7 and back of the recess 6, a movable socket member is located, having two spaced apart strong sides or lugs 11 extending to the rear from an integral, cooperating socket plate 12, recessed at its forward side so as to receive the back portion of the ball 2. Such ball is held between the front end 5 of the hitch housing and such movable socket plate 12. This movable socket or ball engaging member is pivotally mounted on a horizontal pin 13 extending through and between the sides 3 of the housing, towards the front end of the opening 8 and in proximity to the plane of the lower side of the top 4.

A bar 14 in the form of a flat plate of somewhat elongated rectangular form, at its front end has an integral downwardly extending member 15 cast therewith which, at its front end, is also pivotally mounted on the pin or rod 13 between the previously described sides 11. Bar 14, in the operative ball engaging position of the hitch, lies flat against the upper side of the top 4 and has an opening through it for the passage of the lug 9 when moved to such position (Fig. 2). At the rear end of the bar or handle 14 a finger engaging ring 17 is integrally cast or otherwise provided for manual engagement to swing the bar 14 up or down about the axis of the pin 13.

A link 18 extends at its forward end between the sides 11 previously described, through which a pivot pin or rod 19 passes for pivotally connecting the link 18 to the movable ball engaging member, on a pivotal axis which is spaced from and located below the axis of the pin or rod 13. The link 18 at its opposite or rear end passes between two parallel spaced links 20, which at their upper ends are located at opposite sides of the rear portion of the member 15. Pins 21 and 22 pass through the rear end of the link 18 and the lower ends of the link 20, and through the upper ends of links 20 and the rear portion of the member 15, respectively, providing pivotal connections as shown. It will be noted that the distance between the centers of pins 21 and 22 is greater than that between the centers of pins 13 and 19 and that preferably in practice lines connecting the centers of pins 21 and 22 and pins 13 and 19 are substantially parallel.

When the manually operable bar 14 is turned to upper position, as in Fig. 3, the pivotally mounted ball engaging member is swung about the axis of the pin 13 in a counterclockwise direction from the position in Fig. 2. This separates the fixed socket portion of the hitch provided by the front end 5 of the housing and the recess 6 therein, and the recessed socket plate 12, so that the ball 2 may freely enter from below. Thereupon by turning the member 14 to its operative position in Fig. 2, the movable socket plate 12 is moved into engagement with the ball 2 and a secure connection of the hitch therewith made. It will be noted that when the manually operable bar 14 is moved to the Fig. 2 position, the transverse opening through the lug 9 is located immediately above the upper side of bar. A holding pin 23, such as a cotter pin or the like, may be inserted through the opening to insure against any possibility of accidental upward movement of the bar 14 which if occurring, might result in disconnection of the hitch from the ball 2.

When the hitch is in its operative position, as in Fig. 2, the link 18 is located horizontally and its rear end and the lower ends of the links 20 bear against the inclined shoulder 7a. In pulling a trailer by an automobile the ball 2 normally is pressed against the recess 6 of the socket which receives the ball, with a transmission of a pulling force through the closed end 5 of the housing to the bar 10 secured to the trailer. When, as at times happens, the trailer, for example on downgrade, tends to move forward there will be pressure of the socket member 12 against the ball. Such line of pressure will be substantially in a horizontal line through the center of the ball, therefor below the pin 13 which would tend to swing the movable socket member in a counterclockwise direction. However this will be reacted against by the link 18 where it bears against the shoulder 7, so that even though the pin 23 is not used the parts automatically retain their operative locked position.

The structure described is novel and easily manufactured. Substantially the only machine work required is drilling the holes or reaming them through which the several pivot pins or rods 13, 15, 19 and 21 pass. Other openings as in the housing and in the bar 14 are readily cast in producing the housing and such bar 14. The lug 19 will have the transverse opening through it for passage of the pin 23 drilled or otherwise provided, and the holes for passing the bolts which connect the trailer tongue 10 to the housing may be drilled or produced by suitable cores into casting the housing.

The structure is economically produced as to its parts while the assembly is simple and easy. The invention is defined in the appended claims and is to be considered comprehensive of all forms of structure coming within their scope.

I claim:

1. A hitch comprising, a body of inverted channel form in cross section, having a top web and spaced depending side flanges and a depending end closure integral with the body, at its inner side having a concave recess adapted to partly receive a ball member therein, said top web having an opening between its ends, one end of said opening being adjacent said ball receiving recess, a movable socket member spaced from said end of the body having a concave recess in the outer side thereof adapted to engage the opposite side of a ball to thereby, with the end of the body, complete a ball receiving socket, means for pivotally mounting said socket member adjacent its upper portion on and between the sides of said body, a generally horizontal link pivotally connected at one end to said movable socket member below the pivotal mounting of the socket member, a second link pivotally connected at the opposite end of said first mentioned link extending upwardly therefrom, and a flat handle adapted in one position to lie against the top web of the body and at one end extending over the opening in said top, said handle at the end portion thereof over said opening having a downwardly extending projecting portion having the outer end thereof pivotally mounted upon the pivot mounting for said movable socket member, and the second link, at its upper end, having a pivotal connection to said projection at a distance spaced from the pivotal mounting of said socket member substantially equal to the distance between the pivotal connections of the first mentioned link to the second link and to said movable socket member, the distance between the pivots connecting said second mentioned link to the first mentioned link and to said projection on the handle being greater than the distance between the pivotal connection of the movable socket member and the body and the pivotal connection of said first link to said movable socket member, said links being housed between the depending side flanges of the body when said handle is in its horizontal position against the top of said body.

2. A structure as defined in claim 1, said body at the opposite end of the opening in the top thereof having integrally formed therewith a transverse partition between the depending sides of said body, against the adjacent side of which said first mentioned link, when the handle is in its horizontal position against the top of the body, is adapted to bear at one end.

3. A structure as defined in claim 2, said partition at the lower edge portion thereof being increased in thickness to provide a downwardly and outwardly inclined shoulder, against which the pivotally connected ends of the links are adapted to bear when the first mentioned link is in substantially horizontal position.

CHARLES M. HARRIS.

REFERENCES CITED

The following references are of record in the file of this patent:

UNITED STATES PATENTS

| Number | Name | Date |
| --- | --- | --- |
| 2,130,100 | Rasmussen | Sept. 13, 1938 |
| 2,170,980 | Thorp et al. | Aug. 29, 1939 |
| 2,204,882 | Berluti | June 18, 1940 |
| 2,435,024 | Wagner | Jan. 27, 1948 |
| 2,459,448 | Murray | Jan. 18, 1949 |

FOREIGN PATENTS

| Number | Country | Date |
| --- | --- | --- |
| 45,805 | France | Dec. 9, 1935 |
| 553,337 | Germany | June 24, 1932 |